(12) United States Patent
Watanabe et al.

(10) Patent No.: US 6,328,523 B1
(45) Date of Patent: *Dec. 11, 2001

(54) APPARATUS FOR PICKING UP ARTICLES USING A VISION CONTROLLED ROBOT

(75) Inventors: Atsushi Watanabe; Ryuichi Hara; Kazunori Ban; Hidetoshi Kumiya, all of Yamanashi (JP)

(73) Assignee: Fanuc Ltd., Yamanashi (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/295,364

(22) Filed: Apr. 21, 1999

(30) Foreign Application Priority Data

Apr. 21, 1998 (JP) ................................. 10-125368

(51) Int. Cl.[7] ...................................... B25J 13/08
(52) U.S. Cl. .................. 414/416; 414/225.01; 414/729; 414/806; 414/811; 414/815; 198/396; 198/401; 345/433; 901/47
(58) Field of Search ............................. 414/416, 222.07, 414/225.01, 226.02, 226.05, 729–741, 806, 811, 815; 198/394, 395, 396, 401; 345/433, 441; 901/47

(56) References Cited

U.S. PATENT DOCUMENTS

| | | | |
|---|---|---|---|
| 4,909,376 | * | 3/1990 | Herndon et al. .................. 198/395 |
| 5,314,055 | * | 5/1994 | Gordon ............................. 198/395 |
| 5,446,835 | * | 8/1995 | Iida et al. ........................ 345/433 |
| 5,853,078 | * | 12/1998 | Kneubuhler .................... 198/395 X |

FOREIGN PATENT DOCUMENTS

| | | |
|---|---|---|
| 2-299005 | 12/1990 | (JP) . |
| 5-134731 | 6/1993 | (JP) . |
| 6-144584 * | 5/1994 | (JP) . |
| 7-053054 * | 2/1995 | (JP) . |
| 7-319525 | 12/1995 | (JP) . |
| 9-147121 * | 6/1997 | (JP) . |
| 11-123681 | 5/1999 | (JP) . |

OTHER PUBLICATIONS

Japanese Reason For Rejection for corresponding application No. 016314 mailed Feb. 13, 2001.

* cited by examiner

Primary Examiner—Robert P. Olszewski
Assistant Examiner—Gerald J. O'Connor
(74) Attorney, Agent, or Firm—Staas & Halsey LLP

(57) ABSTRACT

A group of bolts are suppled into a placing surface of a tray, an isolated bolt is searched for by a visual sensor, and its deviation from a standard position at the time of teaching is determined. The isolated bolt is picked up by a robot that has been taught how to pick up an isolated bolt laying in a standard position. The position of the robot's hand is corrected according to the deviation from the standard position before the robot attempts to pick up the located isolated bolt. If no isolated bolt is found, a shaking device 1 is operated to loosen the piled-up bolts, and a new isolated bolt is again searched for by the visual sensor. The isolated bolt, if found, is picked up. The picking-up operation may be performed by searching for an isolated small set of bolts using a three-dimensional visual sensor. The oscillating excitation can also be provided by a robot. Also, the piled-up bolts may be loosened or disentangled using a robot equipped with a tool for leveling the pile of bolts or by using a gas jet.

15 Claims, 12 Drawing Sheets

APPARATUS FOR PICKING UP ARTICLES USING A VISION CONTROLLED ROBOT

BACKGROUND OF THE INVENTION

1. Field of the Invention

The present invention relates to an automation technology for handling articles such as assembly workpieces in a factory or other places. More particularly, it relates to an apparatus capable of picking up articles one by one by using an industrial robot (hereinafter referred to as robot) when many articles are placed in a disorderly pile on a table or on a surface of a box or the like.

2. Description of the Prior Art

In an assembly process in a factory, for example, picking up various articles is a basic work element which is indispensable in almost all cases. To automate this work, a robot or a system incorporating a robot and a visual sensor are used.

A problem with the conventional technology is that it is very difficult for the robot to hold and pick up articles one by one when many articles are placed in a disorderly pile.

Figure 1:
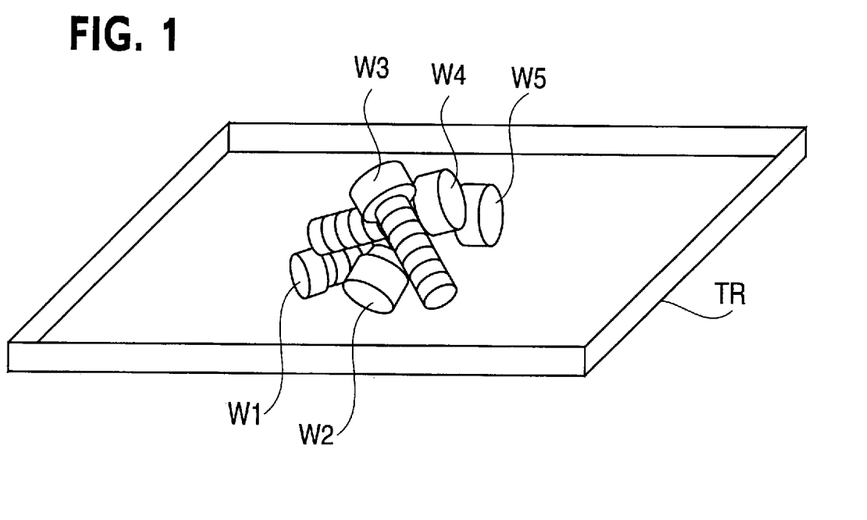
FIG. 1 is a perspective view showing a typical state in which bolts to be picked up are piled up.

For example, where many workpieces W1 to W5 (e.g., five bolts) are placed in a disorderly pile on a tray TR as shown in FIG. 1, it is not easy for a robot to pick up individual workpieces, even with the aid of a visual sensor. Picking up articles is especially difficult for a robot when the holding posture of the robot hand requires a certain accuracy, for example, when the axial direction of a bolt in FIG. 1 must be in agreement with the Z-axis direction of the tool coordinate system.

Figure 2:
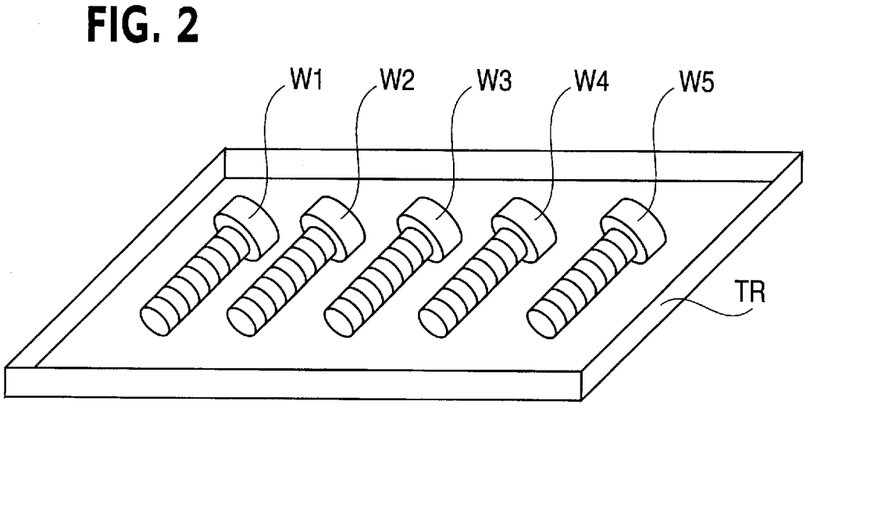
FIG. 2 is a perspective view showing a typical state in which the bolts shown in FIG. 1 are lined up or positioned.

To solve this problem, conventionally, in many cases, the workpieces W1 to W5 are lined up or positioned such that they do not overlap before the robot picks up the workpieces, as shown in FIG. 2. If the visual sensor is used, the accuracy of lining-up or positioning the workpieces W1 to W5 may be reduced, and in some cases, some overlapping of the workpieces is also allowed.

However, to realize the state as shown in FIG. 2 or a similar state, manual work or a largescale automatic lining-up/positioning mechanism is needed, which presents an obstacle to automating the process using a simple system. Also, with either manual work or the use of an automatic mechanism, the process time may be prolonged by lining-up or positioning the workpieces.

OBJECTS AND SUMMARY OF THE INVENTION

An object of the present invention is to provide an apparatus capable of picking up articles one by one from a pile of many articles without manually lining-up or positioning the articles and without using any special lining-up/positioning mechanism.

In the present invention, to attain the above object, even where many articles are piled up, the piled-up articles are loosened (including decreasing the degree of the pile-up of the articles, at least partially, and the elimination of the pile-up) by directly or indirectly providing an appropriate physical action to a group of articles, enabling the robot to pick up the loosened articles one by one.

The article picking-up apparatus, in accordance with the present invention, comprises a robot; articles placing means; loosening means that loosens a pile of articles placed on the articles placing means; and a visual sensor that searches the group of articles on the articles placing means to find at least one article that can be held by the robot in accordance with a predetermined criterion, and obtains data concerning the position of the holdable article. The robot holds and picks up the holdable article using the data concerning the position of the holdable article. Either a two-dimensional or a three-dimensional visual sensor may be used.

As an example of the criterion, an isolated article that does not overlap another article may be a holdable article. Also, another example of the criterion includes that one isolated article or an isolated small set containing a certain number ("N") of, or less than N, articles contacting each other may be a set of holdable articles. The latter criterion is suitable for a picking-up apparatus using a three-dimensional visual sensor. The value of N is selected such that the robot can pick up individual articles from the maximum N number of articles with the aid of the visual sensor, even if the articles are in contact with each other or piled up.

A group of articles to be picked up is subjected to a physical action. This physical action is typically an oscillating motion. As means for giving the oscillating motion to the articles to loosen or disentangle the articles, a shaking device attached to the articles placing means is used or a robot taught an operation for oscillating the articles placing means can be used. Also, a tool for loosening the piled-up articles may be mounted to the robot. The robot is taught to level the pile of articles using the tools to establish a state in which the articles are isolated or in which N number or less articles are in contact with each other.

According to the present invention, the lining-up or positioning of articles, which has conventionally been needed before the robot can hold and pick up the articles, becomes unnecessary. Therefore, manpower or a special-purpose mechanism for lining up or positioning the articles is unnecessary. As a result, great advantages can be obtained in terms of work efficiency and economical cost.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

First Embodiment

Figure 3:
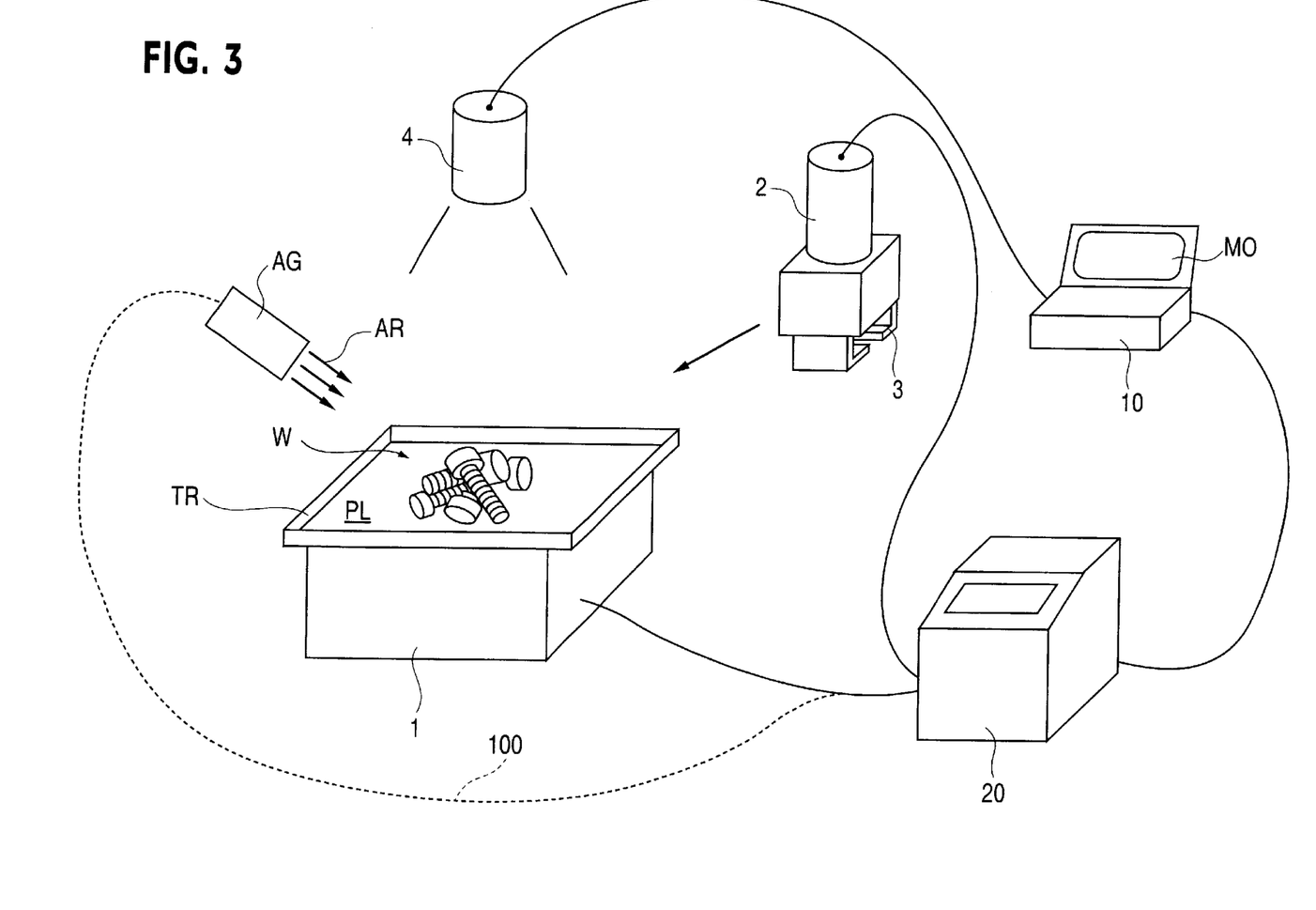
FIG. 3 is a schematic view showing a general arrangement of a system used in a first embodiment of the present invention.

FIG. 3 is a schematic view showing a general arrangement of a system, which includes an article picking-up apparatus in accordance with the present invention, used in a first embodiment of the present invention. In this embodiment, the articles to be picked up are a large number of bolts. In FIG. 3, five bolts are shown as an example, and the whole thereof is indicated by a bolt group W.

The bolt group W is supplied using a supply device (not shown) in such a manner as to be disorderly piled up on a placing surface PL of a tray TR. The tray TR is attached to a shaking device 1 so that a physical action is provided to the bolt group W. When the shaking device 1 is operated, the tray TR is oscillated so that the piled-up bolt group W is loosened or disentangled.

A CCD camera 4, which has a field of view covering almost the whole of the tray TR, is provided at an appropriate place just above the tray TR, and a robot 2 (only the hand portion thereof is shown) is provided at an appropriate place near the tray TR. The robot 2 is equipped with a hand 3 suitable for holding individual bolts.

An image processing device 10 is connected to the camera 4. Both the image processing device 10 and the camera 4 constitute a publicly known, two-dimensional visual sensor. Reference character MO denotes a monitor display containing a liquid crystal display, a CRT, or the like attached to the image processing device 10, which can display images obtained by the camera 4 or images processed by the image processing device 10.

A robot controller 20 is used to control the whole system. The robot controller 20 is connected to not only the robot 2, but also to the shaking device 1, the image processing device 10, and necessary external devices (for example, a mechanism for supplying the bolt group W to the tray TR). The following is a rough description of the roles of the principal elements.

Shaking Device 1:

The shaking device 1 oscillates the tray TR on command from the robot controller 20 to give an oscillating motion to the bolt group W. A shaking device using, for example, an electromagnet and other types of shaking devices are publicly known. Therefore, the details are omitted.

Two-dimensional Visual Sensor:

(1) The two-dimensional visual sensor photographs the bolt group W using the camera 4 on command from the robot controller 20 when the shaking device 1 is stopped, and takes the image in the image processing device 10.

(2) The image processing device 10 analyzes the image and searches for a holdable bolt and detects the position of the found holdable bolt. The result is sent to the robot controller 20. Here, a "holdable bolt" (a holdable article, in general) means a bolt that can be held exactly by the robot 2. The presence of holdable bolts is judged in accordance with a preset criterion. In this embodiment, an "isolated bolt" is taken as the holdable bolt, as described later.

Robot Controller 20:

(1) The robot controller 20 operates the shaking device 1 at a predetermined time for a fixed period of time (e.g., for several seconds) to provide an oscillating motion to the bolt group W, by which holdable bolts (in this embodiment, isolated bolts) are produced.

(2) The robot controller 20 operates the visual sensor (camera 4 and image processing device 10) at a predetermined time to perform photographing, image accumulation, image processing, etc. Also, it receives the data representing the success in searching for holdable bolts and the data concerning the positions of the holdable bolts from the image processing device 10.

(3) When a holdable bolt exists on the tray TR, the robot controller 20 starts an operation program (a picking-up operation has been taught in advance) and operates the robot 2 to pick up an individual holdable bolt. In the operation program, approaches for the picking-up operation, holding, and transfer after holding have been taught. The teaching may be performed by placing a single bolt lying in a standard posture at a standard position on the tray TR and by making the robot controller 20 store the picking-up operation by using a teaching playback system.

At the time of playback operation for the actual work, the approach path and holding posture of the robot are corrected on the basis of the data concerning the position (including posture) of a holdable bolt (in this embodiment, an isolated bolt, the details of which are described later) output from the visual sensor.

Figure 4:
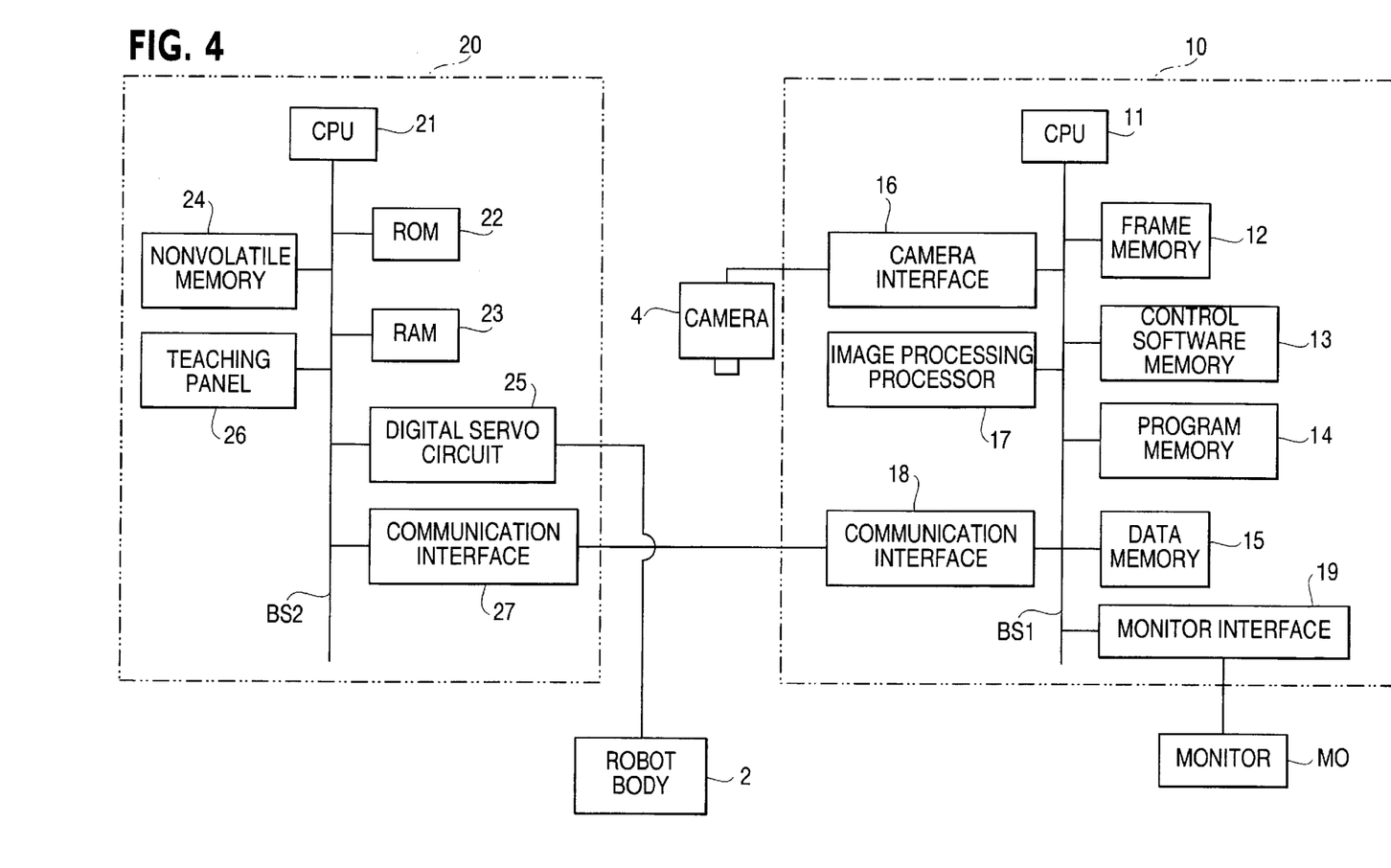
FIG. 4 is a block diagram showing a somewhat detailed configuration of the system shown in FIG. 3.

FIG. 4 is a block diagram showing a somewhat detailed configuration of the abovedescribed system. Referring to FIG. 4, the image processing device 10 has a central processing unit (hereinafter referred to as a CPU) 11. The CPU 11 connects with, via a bus BS 1, a frame memory (image memory) 12, a control software memory 13 configured with a ROM, a program memory 14 configured with a RAM etc., a data memory 15 configured with nonvolatile RAM, a camera interface 16, an image processing processor 17, a communication interface 18, and a monitor interface 19.

The communication interface 18 is connected to a communication interface 27 on the side of the robot controller 20, and signals representing data and commands are transferred via both of these interfaces. Also, the camera 4 is connected to the camera interface 16. Further, the monitor MO is connected to the monitor interface 19 so that the image captured by the camera 4, the image invoked from the frame memory 12, and the processed image (for example, a contour extract image) can be seen at an appropriate time.

The image captured by the field of view of the camera 4 is converted into a variable density image by grey scale and stored in the frame memory 12. The image processing processor 17 processes the image stored in the frame memory 12 on command of the CPU 11. The control software memory 13 stores the following programs and related parameters:

(1) A control program for the CPU 11 to control the visual sensor.

(2) A calibration program for setting a sensor coordinate system using a jig.

(3) An image analyzing program for searching for an isolated bolt and detecting the position of the isolated bolt, described later, using the image processing processor 17.

(4) A program for sending and receiving data to and from the robot at appropriate times.

The image captured by the camera 4, the image invoked from the frame memory 12, and the processed image (for example, a contour extract image) can be seen on a display screen of the monitor MO at an appropriate time.

The robot controller 20 also has a central processing unit (CPU) 21. The CPU connects with, via a bus BS2, a ROM 22 for storing various control programs including a program for executing the processing for a picking-up operation (described later); a RAM 23 used for the temporary storage of calculation data, etc.; a nonvolatile memory 24 for storing teaching data and various parameters; a digital servo circuit 25 for controlling the individual axes of the robot body 2; a teaching panel 26 for performing manual operations, setting a coordinate system, position teaching, automatic operation (playback operation), etc. of the robot; and a general purpose signal interface 27 connected to the communication interface 18 on the side of the image processing device 10.

Figure 5:
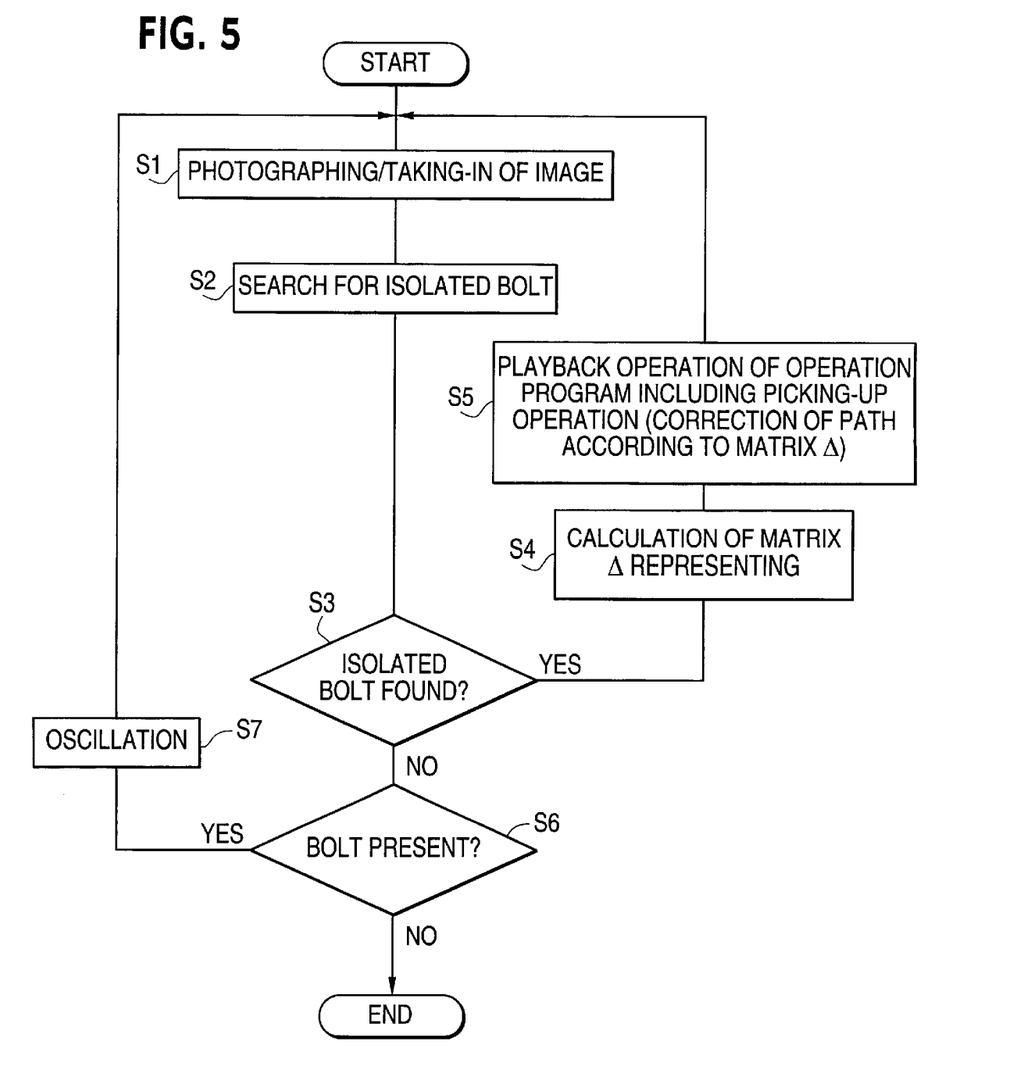
FIG. 5 is a flowchart outlining the picking-up process in the first embodiment.

Next, an outline of the process for executing the picking-up operation using the above-described system will be described with reference to a flowchart shown in FIG. 5. Each step shown in FIG. 5 is described below. In this process, it is assumed that the calibration of the visual sensor, and the teaching of approaches, holding, transfer after holding, etc. for the picking-up operation have been finished.

Step S1: The bolt group W is photographed by the camera 4 on command from the robot controller 20, and the image is taken in the image processing device 10.

Step S2: The taken-in image is analyzed, and an isolated bolt is searched for as a holdable bolt. Here, the "isolated bolt" means a bolt such that the contour of the bolt is isolated (not overlapped) from other bolt images on the screen as indicated by reference character A or B in FIG. 6. One example of image processing software for searching for an isolated bolt is the publicly known pattern matching method.

Figure 6:
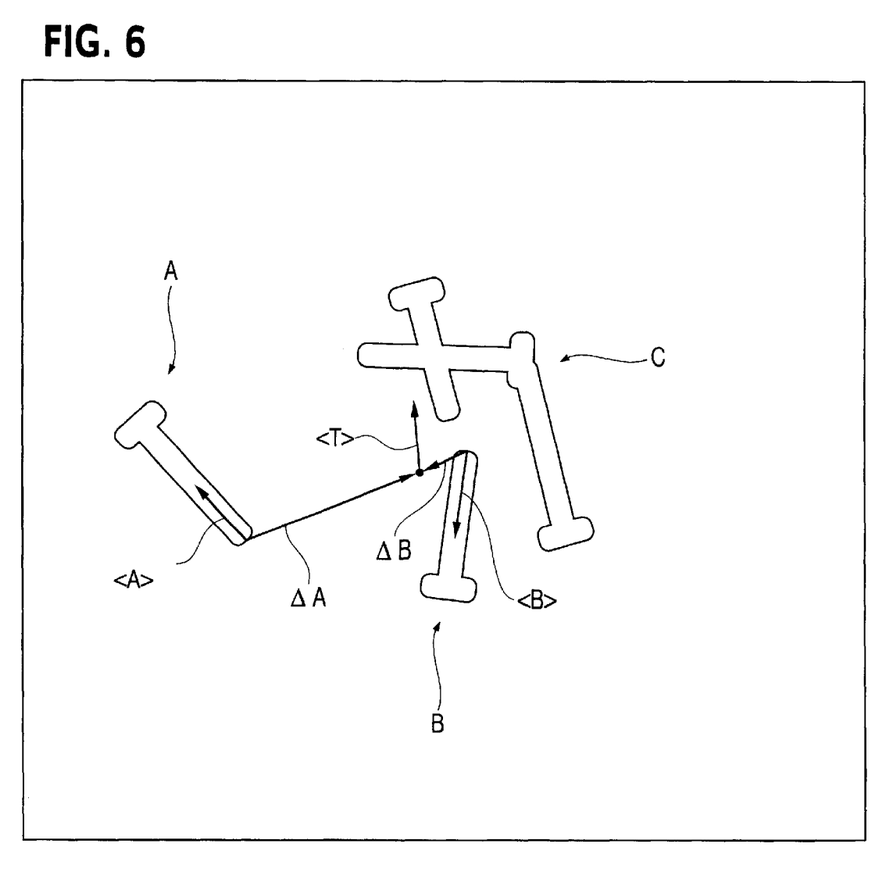
FIG. 6 is a plan view illustrating the search for an isolated bolt.

According to this method, a standard pattern (here, a bolt contour image) representing the shape and size of an article to be searched for is stored in the image processing device 10 in advance, and the contour image element actually captured is compared with the standard pattern. In this example, the contour image elements A, B and C as shown in FIG. 6 are compared with the standard pattern in succession. The contour image elements A and B are capable of being overlapped on the standard pattern (in other words, they can be matched with each other), so that they are judged to be the images of isolated bolts. The contour image element C is incapable of being overlapped on the standard pattern (in other words, the contour image element C and the standard pattern cannot be matched with each other), so that the contour image element C is judged not to be the image of an isolated bolt.

Step S3: If at least one isolated bolt is found when searching for an isolated bolt, the process proceeds to Step S4. If none is found, the process proceeds to Step S5. For example, in the case shown in FIG. 6, the process proceeds to Step S4.

Step S4: The position of the found isolated bolt is detected, and a deviation from a standard position in teaching (indicated by vector T) is determined. For example, in the case shown in FIG. 6, taking the image of a first found isolated bolt as A, a matrix ΔA (homogeneous transformation matrix of four lines and four rows) representing the relationship between vector A and vector T is determined. The matrix ΔA is calculated assuming that vector A and vector T lie on a fixed plane (XY plane: Z=0) and the Z component of vector T is zero. The rotation component of matrix ΔA represents the rotation on the XY plane, and the translation component thereof represents the translation on the XY plane.

Step S5: The operation program having been taught in advance is started, and the robot 2 is operated to pick up isolated bolt A. At this time, the approach path and holding posture of the robot are corrected in accordance with the data of matrix ΔA. After the operation is finished, the process returns to Step S1. Subsequently, steps S2 and S3 are executed again. If an isolated bolt remains, the process further proceeds from Step S3 to Step S4. In the case shown in FIG. 6, a matrix ΔB representing the relationship between vector B and vector T is determined.

Step S6: In the case where no isolated bolt is found, two situations are assumed. That is, if a bolt image is present, but no isolated bolt is found (two or more bolts remain), the process proceeds to Step S7. If a bolt image itself is absent, the process is finished because this state means that all bolts have been picked up.

Step S7: The shaking device 1 is operated for a fixed period of time to give an oscillating motion to the bolt group remaining on the tray TR. After the operation of the shaking device 1 is stopped, the process returns to Step S1. In many cases, the oscillating motion causes some or all of the piled-up bolts to be separated, and one or more new isolated bolts are produced.

If a new isolated bolt is produced, the processing cycle of Step S1→Step S2→Step S3→Step S4→Step S5→Step S1 is executed. If the oscillating motion is insufficient and no new isolated bolt is produced, the process proceeds from Step S1 to Step S2 to Step S3 to Step S6 to Step S7, and the shaking device 1 is operated for a fixed period of time again. After the operation of the shaking device 1 is stopped, the process returns to Step S1. Subsequently, this cycle is repeated until the judgment result in Step S3 becomes Yes.

By carrying out the aforementioned process, isolated bolts are picked up one after another. When all bolts have been picked up, the judgment result in Step S6 is No, and the process is finished.

Second Embodiment

In a second embodiment, a three-dimensional visual sensor is used in place of the two-dimensional visual sensor. A spotlight scanning type projector, incorporating a spotlight projector capable of random scanning and a PSD (position sensitive light detector) 50, is used as the three-dimensional visual sensor. Other types of three-dimensional visual sensors may be used, for example, a slit light projector type three-dimensional visual sensor incorporating a slit light projector and a CCD camera may be used. Further, as a criterion for searching for a holdable bolt, a criterion different from that of the first embodiment is used (the details are described later).

Figure 7:
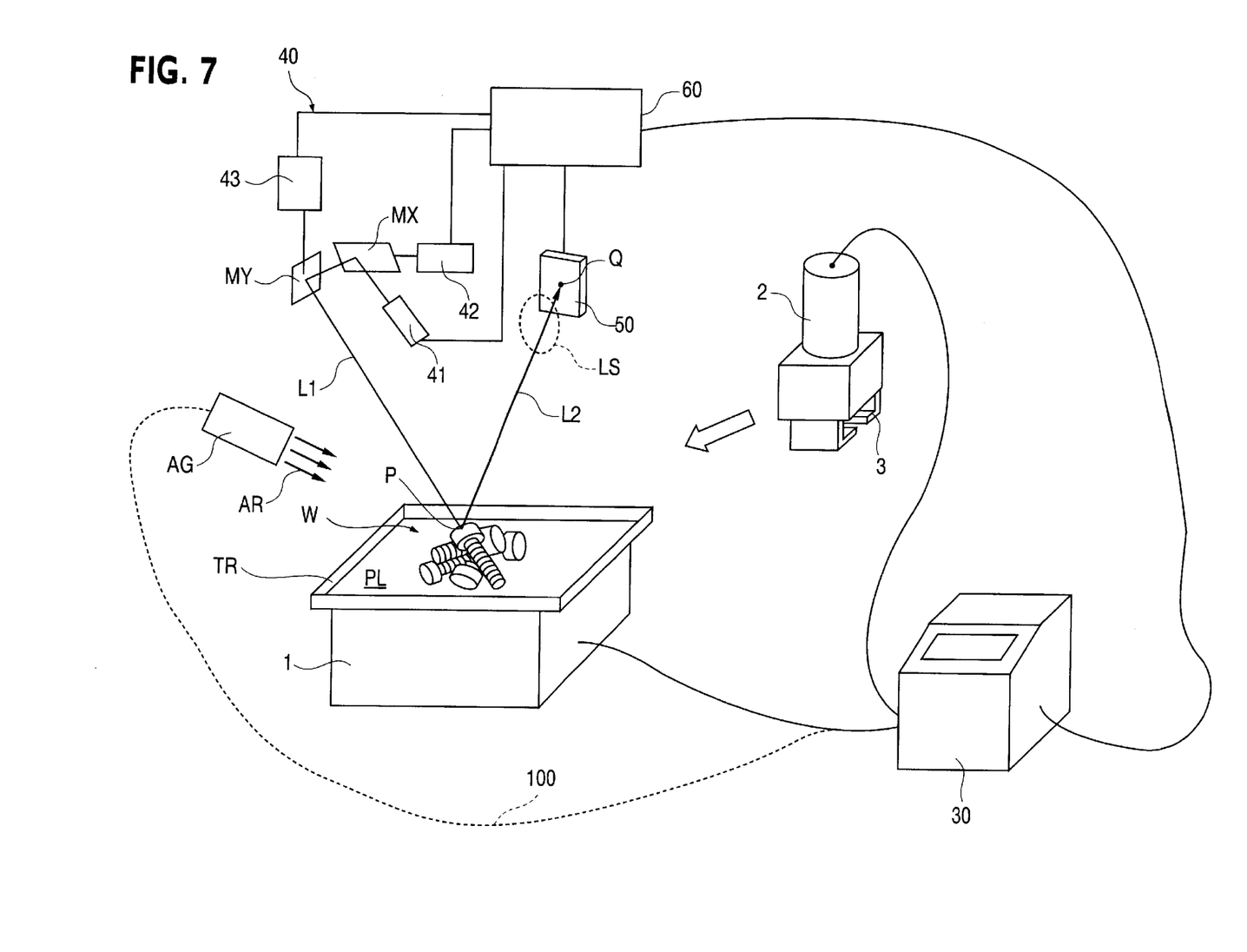
FIG. 7 is a schematic view showing a general arrangement of a system used in a second embodiment of the present invention.

FIG. 7 is a schematic view, according to the second embodiment of the present invention, showing a general arrangement of another system having an article picking-up apparatus and method in accordance with the present invention. As in the first embodiment, the articles to be picked up are a large number of bolts. In FIG. 7, five bolts are shown as an example, and the whole thereof is indicated by a bolt group W.

As in the first embodiment, the bolt group W is supplied using a supply device (not shown) such that a disorderly pile of bolts is placed on a placing surface PL of a tray TR. The tray TR is attached to a shaking device 1 so that an oscillating motion is provided to the bolt group W. A robot 2 (only the hand portion thereof is shown) is provided at an appropriate place near the tray TR, and a projector 40 which covers almost the whole of the tray TR as a scannable region and a PSD 50 equipped with a lens system LS are disposed at appropriate places around the tray TR. The projector 40 is made up of a laser beam source 41, deflectors 42 and 43 in which two rotating deflection axes intersect at right angles, and mirrors MX and MY attached to the deflectors 42 and 43, respectively.

The driving control of the projector 40 and the processing of output signals of the PSD 50 are carried out by a projector driving/signal processing device 60. The projector 40, PSD 50 and projector driving/signal processing device 60, together with a part (software and hardware for searching for a holdable bolt in accordance with the criterion) of a robot controller 30, constitute the publicly known three-dimensional visual sensor.

As in the first embodiment, the robot 2 is equipped with a hand 3 suitable for holding the individual bolt. The robot controller 30 is used as a controller for the whole system. The robot controller 30 is connected not only to the robot 2, but also to a shaking device 1, the projector driving/signal processing device 60, and necessary external devices (for example, a mechanism for supplying the bolt group W to the tray TR). The following is a rough description of the roles of the principal elements.

Shaking Device 1:

The shaking device 1 is the same as that used in the first embodiment. It oscillates the tray TR on command from the robot controller 30 to give an oscillating motion to the bolt group W.

Three-dimensional Visual Sensor:

(1) The projector driving/signal processing device 60, receiving a command from the robot controller 30 when the shaking device 1 is stopped, scans the bolt group W with a spot beam L1 projected from the projector 40, and carries out detection with the PSD 50 via the lens system LS. The data detected by the PSD 50 is processed by the projector driving/signal processing device 60, and the data concerning the three-dimensional position for the bolt group W are collected. The collected data are sent to the robot controller 30.

(2) The spotlight projection type three-dimensional visual sensor is publicly known (for example, see Japanese Patent Application Laid-Open No. 6-229732 and Japanese Patent Application Laid-Open No. 7-270137). Therefore, the detailed description thereof is omitted, and only the measurement principle is briefly described. The deflectors 42, 43 control the directions of the mirrors MX and MY according to a set of voltage commands (Vx, Vy) issued from the projector driving/signal processing device 60.

Therefore, if the relationship between the voltage commands (Vx, Vy) and the position (equation of a straight line) of the spot beam L1 is determined in advance by calibration, the spot beam L1 can perform scanning in a desired pattern by programming the time-related change pattern of the voltage commands (Vx, Vy).

The spot beam L1 incident on a certain position P at any point in time produces a luminescent spot. This luminescent spot is detected by point Q on the light intercepting face of the PSD 50 via the lens system LS. The PSD 50 may be one-dimensional. As the direct output of the PSD 50, two currents i1 and i2 according to the one-dimensional position of point Q are output. They pass through a publicly known analog signal processing circuit, and are converted into an output signal Vq representing the one-dimensional position of point Q.

The three-dimensional position of the incident position P is determined by solving, as simultaneous equations, the straight line equation representing the spot beam L1 specified by (Vx, Vy) and the conditional expression that gives the output signal Vq for point Q. Actually, the relational expression $P(x, y, z)=f(Vx, Vy, Vq)$ approximately representing the general solution of the above simultaneous equations is stored in advance in the projector driving/signal processing device 60 or the robot controller 30, by which the three-dimensional position of point P can be detected at any time.

Robot controller 30:

(1) The robot controller 30 operates the shaking device 1 at a predetermined time for a fixed period of time (for example, for several seconds) to give an oscillating motion to the bolt group W, thereby producing holdable bolts. The definition (criterion) of the holdable bolt differs from that in the first embodiment, as described later.

(2) The robot controller 30 operates the spotlight scanning type of three-dimensional visual sensor at a predetermined time to obtain the data concerning the three-dimensional position for the bolt group W.

(3) As in the first embodiment, when a holdable bolt is present on the tray TR, the robot controller 30 starts an operation program (for which a picking-up operation has been taught in advance) and operates the robot 2 to pick up an individual holdable bolt.

In the operation program, approaches for the picking-up operation, holding, and transfer after holding are taught. The teaching may be performed by placing a single bolt lying in a standard posture at a standard position on the tray TR and by making the robot controller 20 store the picking-up operation using a teaching playback system.

At the time of playback operation for the actual work, the approach path and holding posture of the robot are corrected on the basis of the data concerning the position of a holdable bolt output from the three-dimensional visual sensor (the details are described later).

Figure 8:
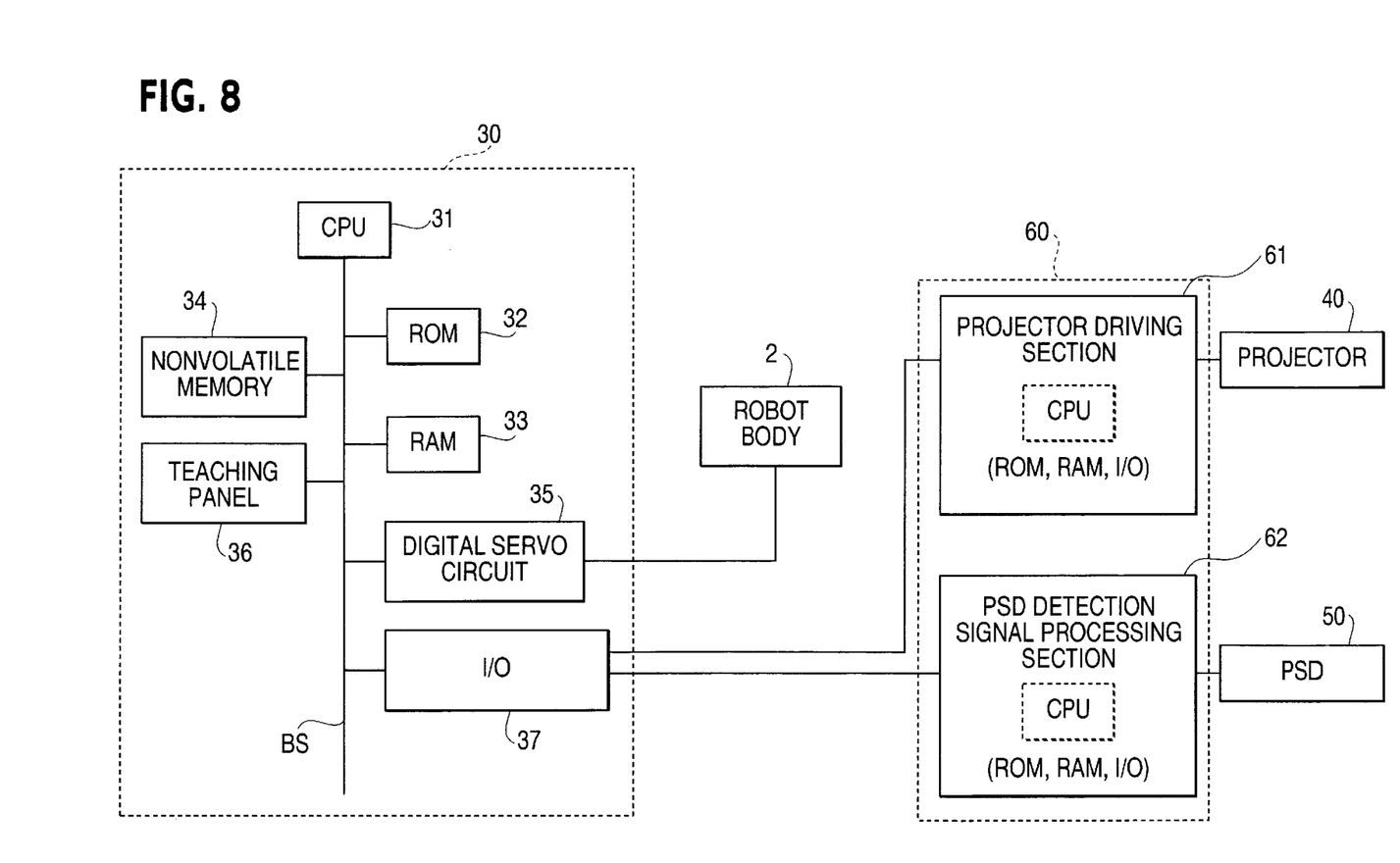
FIG. 8 is a block diagram showing a somewhat detailed configuration of the system shown in FIG. 7.

FIG. 8 is a block diagram showing a somewhat detailed configuration of the system in the second embodiment. Referring to FIG. 8, the robot controller 30 has a CPU 31. The CPU 31 connects with, via a Bus BS, a ROM 32 for storing various control programs; a RAM 33 used for the temporary storage of calculation data, etc; a nonvolatile memory 34 for storing taught data and various parameters; a digital servo circuit 35 for controlling the individual axes of the robot body 2; a teaching panel 36 for performing manual operations, setting the coordinate system, position teaching, automatic operation (playback operation), etc. of the robot; and an input-output device (I/O) 37. In particular, in this embodiment, the control program includes programs for executing the search for a holdable bolt, the detection of the position of the holdable bolt, and the picking-up operation of the holdable bolt by means of the robot 2 (the details of processing will be described later).

The input-output device (I/O) 37 is connected to a projector driving section 61 and PSD detection signal processing section 62 of the protection driving/signal processing device 60. The projector driving section 61 and the PSD detection signal processing section 62 each have a required CPU, memories, input-output device, and the like. The former is connected to the projector 40 to control the driving of the laser beam source 41 of the deflectors (galvanometers) 42 and 43, and the latter processes the output signals of the PSD 50, and sends the signal Vq representing the position of detection point Q to the robot controller 30. The processing such as the acquisition of three-dimensional position data based on the voltage commands Vx, Vy, Vq and the subsequent search for a holdable bolt is performed in the robot controller 30.

Figure 9:
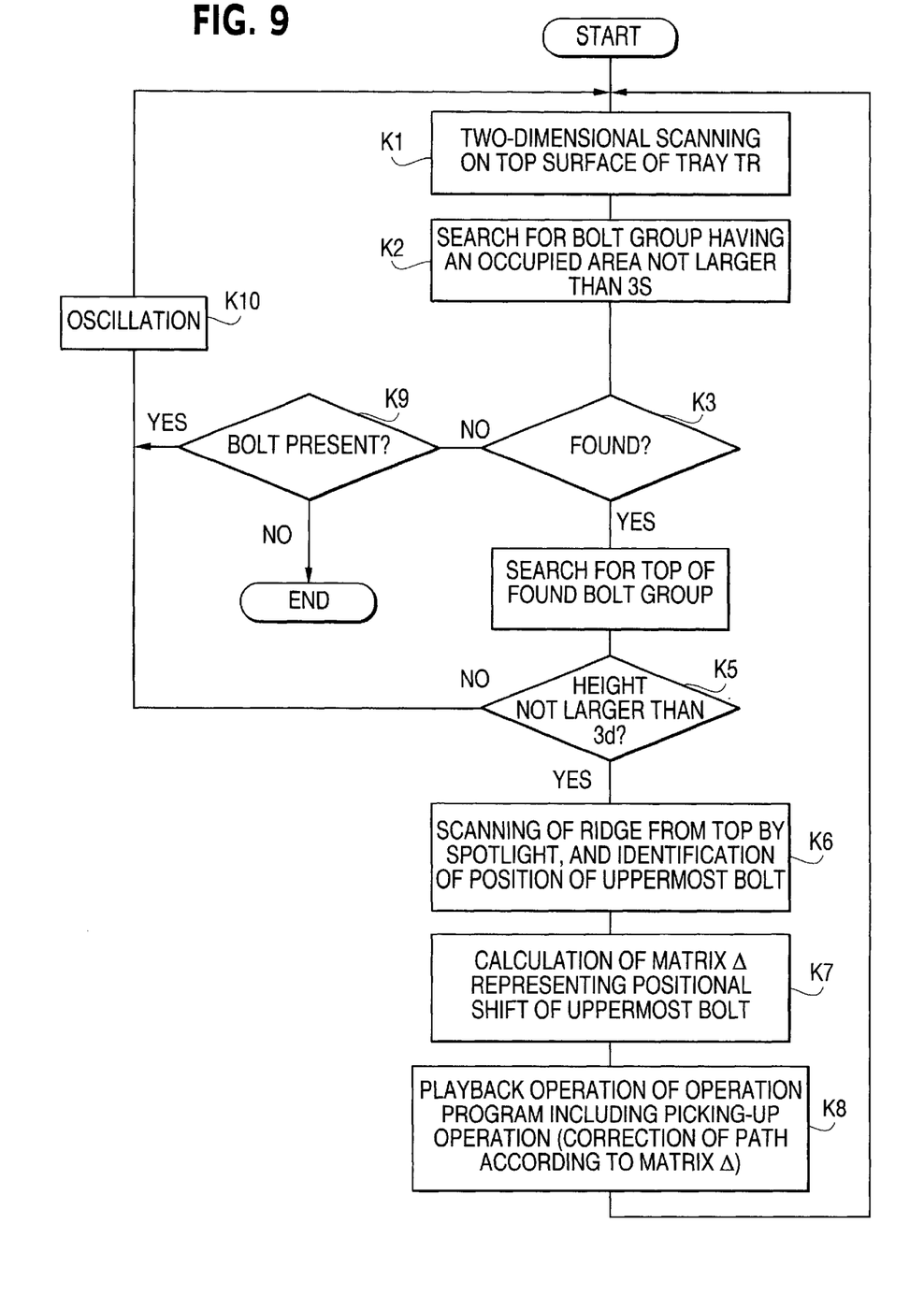
FIG. 9 is a flowchart outlining the picking-up process in the second embodiment.

Next, an outline of the process for executing the picking-up operation using the above-described system will be described with reference to a flowchart shown in FIG. 9. Each step shown in FIG. 9 is described below. In this process, it is assumed that the calibration of the visual sensor, and the teaching of approaches, holding, transfer after holding, etc. for the picking-up operation have been finished. Also, as a world coordinate system representing the threedimensional position, a coordinate system in which a placing surface PL of the tray TR is taken as the XY plane (Z=0), and the vertical upward direction is taken as +Z axis direction is set in the system (robot controller 30).

Figure 10:
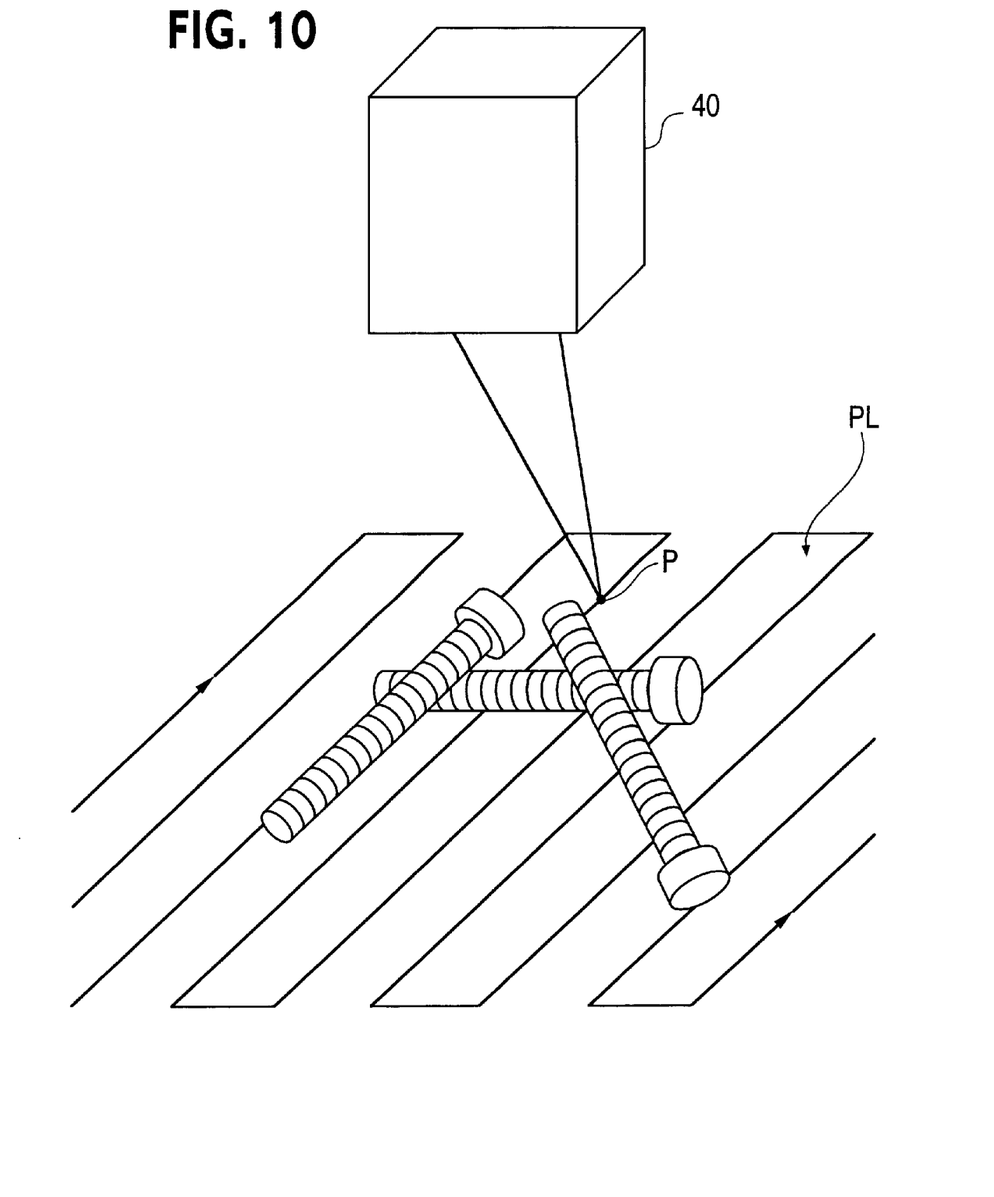
FIG. 10 is a perspective view showing a state in which the top surface of a tray is scanned two-dimensionally by a spotlight of a projector.

Step K1: As shown in FIG. 10, the top surface of the tray TR is scanned two-dimensionally by the projector 40, and the three-dimensional position data concerning the incident point P of the spotlight is collected. If Z>0, it is found that the incident point P of the spotlight lies on a bolt. If Z=0, it is found that the incident point P on the spotlight lies on the placing surface PL (where any bolt is absent) of the tray TR.

Figure 11:
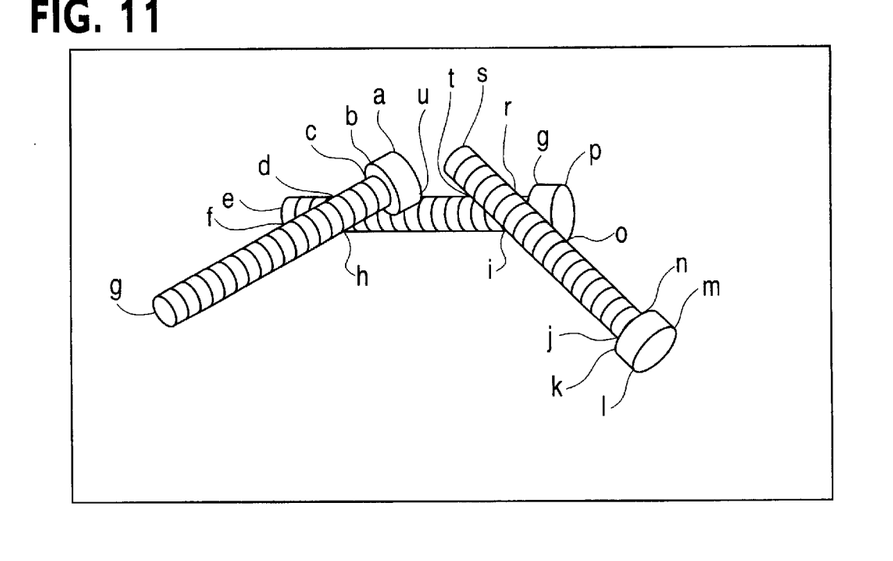
FIG. 11 is a view illustrating the occupied area of bolts.

Step K2: As a first step for searching for an isolated small set of bolts, including holdable bolts, as shown in FIG. 11, a bolt group is searched for such that the occupied area (area surrounded by reference characters a, b, c, . . . s, t, u) is not larger than a reference value 3S. Here, S is a reference value approximately representing an area occupied by a single bolt, and it is preferable that the optimum value be finely adjusted by tuning, by rule of thumb, etc. Generally, if S is small, a set consisting of four or more bolts can be easily excluded (that is, the set is not judged to be an isolated small set).

Step K3: If at least one bolt group having an occupied area not larger than 3S is found in Step K2, the process proceeds to Step K4. If none is found, the process proceeds to Step K9.

Step K4: A top (a point that gives the maximum Z-axis value) of the bolt groups is searched for based on the three-dimensional position data concerning the found bolt group.

Figure 12:
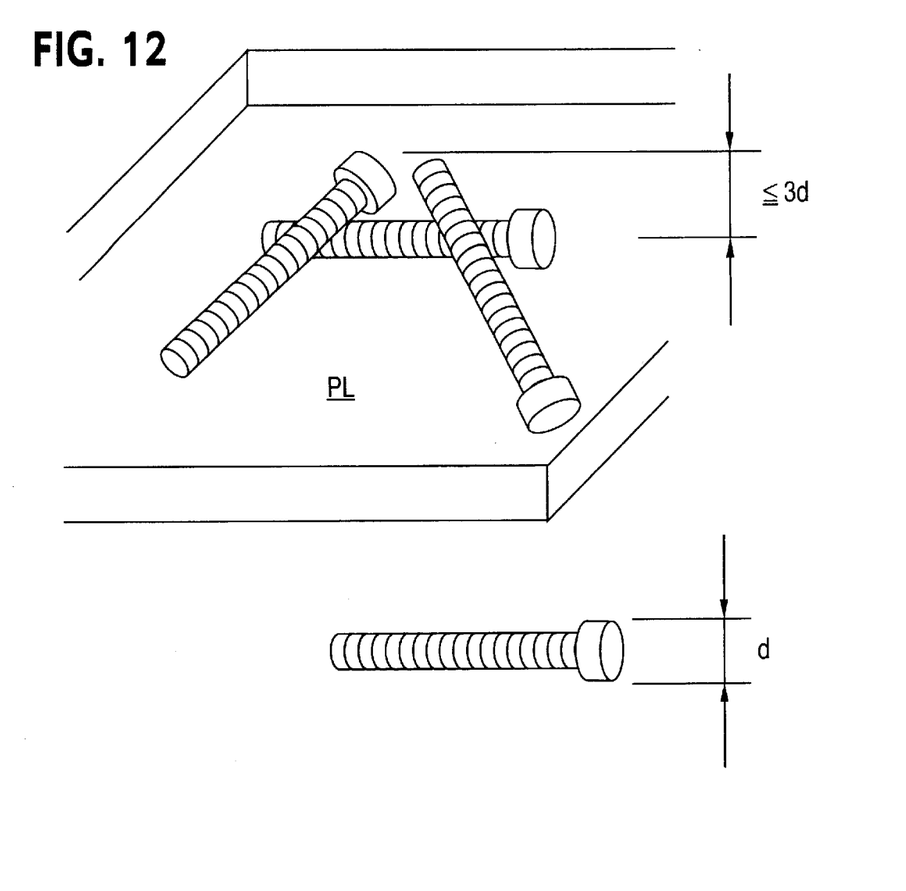
FIG. 12 is a view illustrating the height of the top of a group of bolts.

Step K5: As shown in FIG. 12, if the top height is not larger than a reference value 3d, the set is judged to be an isolated small set of bolts, including holdable bolts, and the process proceeds to Step K6. If the top height exceeds the reference value 3d, the bolt group consists of bolts piled up over and over again, and the bolt group is not a small bolt group including holdable bolts, and the process proceeds to Step K10.

Here, as additionally shown in FIG. 12, "d" is a reference value approximately representing a diameter (a height when the bolt is placed horizontally) of a single bolt, and it is preferable that the optimum value be finely adjusted by tuning, by rule of thumb, etc. Generally, if d is small, a set consisting of four or more bolts can easily be excluded.

As explained above, the criterion in this embodiment is used for searching for an "isolated small set" from both the viewpoints of occupied area and top height.

Figure 13:
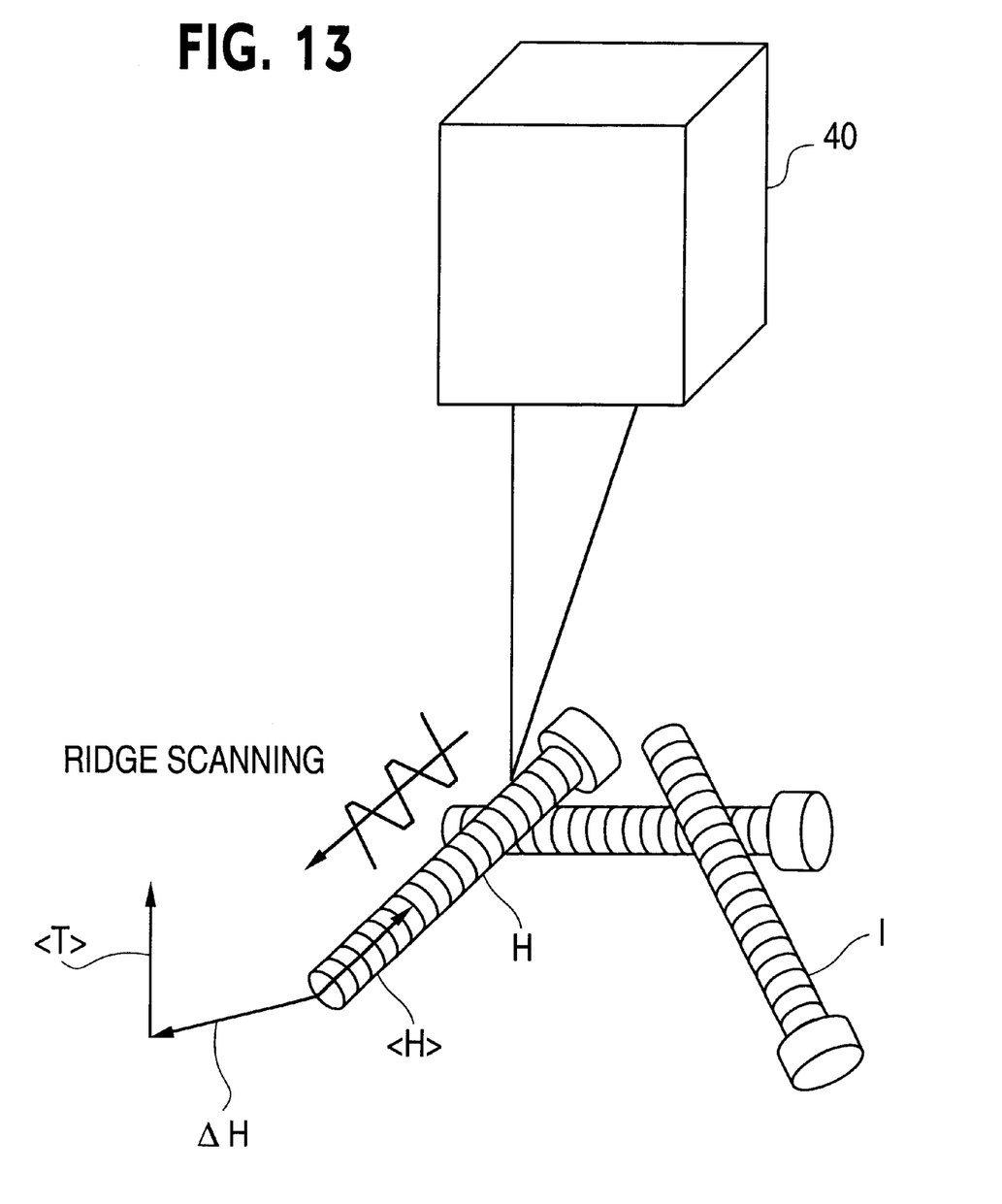
FIG. 13 is a perspective view illustrating a state in which the portion around a ridge extending from the top is scanned by a spotlight and a positional shift of an uppermost bolt.

Step K6: As shown in FIG. 13, a ridge extending from the top is scanned by a spotlight, and the position data concerning the ridge is collected. Then, vector H representing the position of an uppermost bolt H is determined. Generally, the Z component of vector H is not zero.

Step K7: A matrix ΔH (homogeneous transformation matrix of four lines and four rows) representing a deviation of vector H from a standard position (indicated by vector T) at the time of teaching is determined. Vector T lies on the XY plane, but vector H does not lie on the XY plane. The rotation component of matrix ΔH represents the rotation in the three-dimensional space, and the translation component thereof represents the translation in the three-dimensional space.

Step K8: The operation program having been taught in advance is started, and the robot 2 is operated to pick up the uppermost bolt H. At this time, the approach path and holding posture of the robot are corrected in accordance with the data of matrix ΔH. After the operation is finished, the process returns to Step K1.

Subsequently, step S2 and the subsequent steps are executed again. If an isolated small set remains, Step K8 is reached again, and the next bolt (for example, bolt I in FIG. 13) is picked up.

Step K9: If the judgement result in Step K3 is No, two situations are assumed. That is, if the bolt image is present but no isolated small set is found (several or more bolts remain), the process proceeds to Step K10. If the bolt image is absent, the process is finished because this state means that all bolts have been picked up.

Step K10: The shaking device 1 is operated for a fixed period of time to give an oscillating motion to the bolt group remaining on the tray TR. After the operation of the shaking device 1 is stopped, the process returns to Step K1. In many cases, by the oscillating motion, some or all of the piled-up bolts are separated, and one or more new isolated bolts are produced.

If a new isolated small set is produced, the processing cycle of Step K1→Step K2→. . . →Step K8→Step K1 is executed. If the oscillating motion is insufficient and no new isolated small set is produced, the shaking device 1 is operated for a fixed period of time again through Step K2→Step K3→Step K9 or Step K2→. . . →Step K5. After the operation of the shaking device 1 is stopped, the process returns to Step K1. Subsequently, this cycle is repeated until the judgment results in step K3 and Step K5 become Yes.

By carrying out the aforementioned process, bolts are picked up one after another. When all bolts have been picked up, the judgement result in Step K9 is No, and the process is finished.

In the above two embodiments, the physical action applied to a group of articles to loosen the piled-up articles is an oscillating motion, and time oscillation motion is produced by the shaking device attached to the tray TR. However, the present invention is not limited to these examples.

Figure 14:
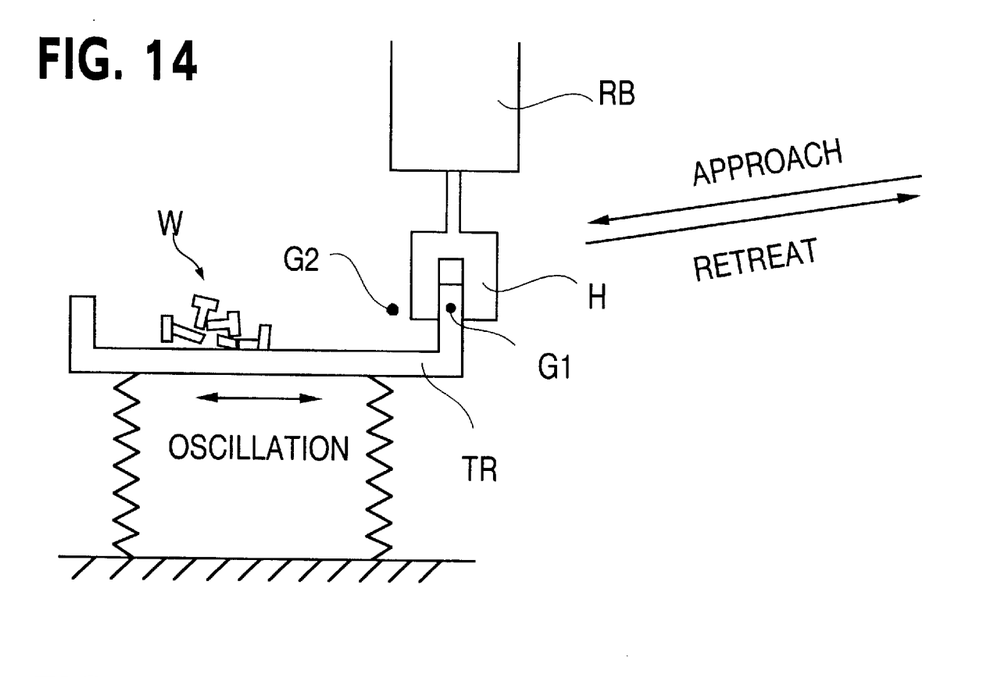
FIG. 14 is a view illustrating an oscillating motion provided by a robot.

For example, the physical action may be applied by a robot RB (which may be the same as, or separated from, a robot for holding the article). In this case, as shown in FIG. 14, the tray TR is supported elastically, and the operation for approaching the edge of the tray TR, the operation for holding the edge of the tray TR by a hand H, the oscillating operation (for example, the reciprocating motion between G1 and G2) with the tray TR being held, the retreat operation, etc. are taught by the robot RB in advance.

Figure 15:
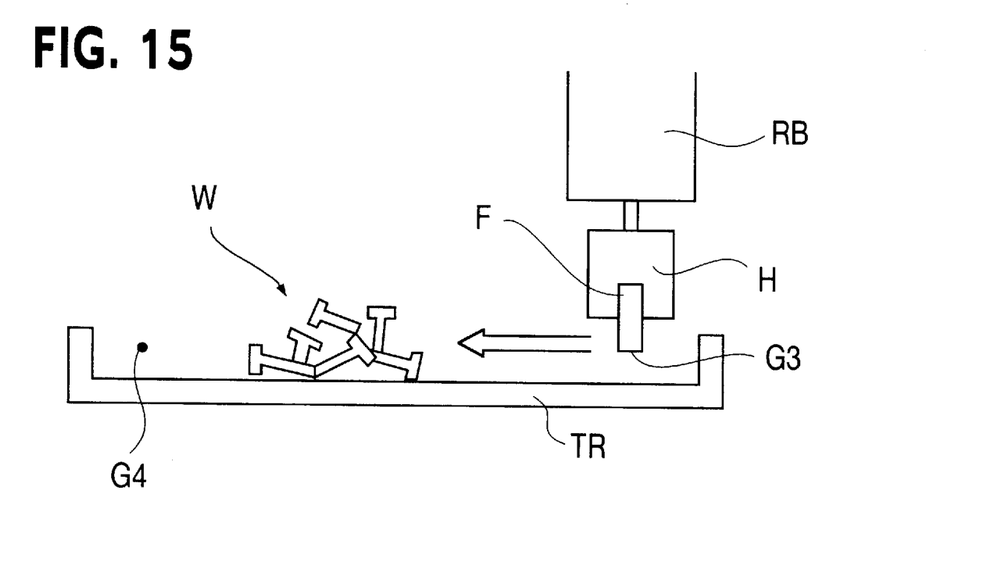
FIG. 15 is a view illustrating an operation for loosening the piled-up articles using a loosening device supported by the robot.

Also, as shown in FIG. 15, the robot RB may be equipped with a loosening member F, such as a leveling plate or a brush-like leveling member, to loosen the piled-up article group. In this case, an operation suitable for loosening the piled-up article group (for example, the reciprocating motion between G3 and G4) is taught to the robot RB.

Further, as shown in FIGS. 3 and 7, an air gun AG may be provided near the tray TR to loosen the piled-up article group W by an air jet AR or jet of any other gas blown from the air gun AG. The broken line 100 in the figures indicates a cable 100 connecting the air gun AG to the robot controller 20 or 30 when the air gun AG is used. The air gun AG is operated on command from the robot controller 20 or 30. It may be used together with the shaking device 1 (switching operation, simultaneous operation, etc.), or it may be used as a means for loosening by substituting for the shaking device 1.

What is claimed is:

1. A robotic apparatus for picking up objects placed in a pile on a surface, comprising:

dispersing means for dispersing the objects placed in a pile to provide isolated objects and isolated groups of piled objects, each one of the isolated groups of piled objects having a top object;

a visual sensor searching the objects on the surface to find each one of the isolated objects and each one of the isolated groups of piled objects, and obtaining position data for each isolated object found and each isolated group of piled objects found; and a robot grasping and picking up each isolated object found and the top object of each isolated group of piled objects.

2. The apparatus of claim 1, wherein said visual sensor is a two-dimensional visual sensor.

3. The apparatus of claim 2, wherein each isolated group of piled objects is determined according to a surface area occupied by the isolated group on the surface and a height of the pile of objects in the group.

4. The apparatus of claim 1, wherein said visual sensor is a three-dimensional visual sensor.

5. The apparatus of claim 4, wherein each isolated group of piled objects is determined according to a surface area occupied by the isolated group on the surface and a height of the pile of objects in the group.

6. The apparatus of claim 1, wherein each isolated group of piled objects is determined according to a surface area occupied by the isolated group on the surface and a height of the pile of objects in the group.

7. The apparatus of claim 1, wherein said dispersing means provides an oscillating motion.

8. The apparatus of claim 1, wherein said dispersing means is a shaking device oscillating the surface.

9. The apparatus of claim 1, wherein said dispersing means is said robot oscillating the surface.

10. The apparatus of claim 1, wherein said dispersing means is said robot contacting the objects piled on the surface with a leveling member.

11. The apparatus of claim 1, wherein said dispersing means disperses the objects piled on the surface using a gas injecting device with a gas jet.

12. A robotic apparatus for picking up objects placed in a pile on a surface, comprising:

dispersing means for dispersing the objects placed in a pile to provide isolated objects and isolated groups of piled objects, each one of the isolated groups of piled objects having a top object;

a visual sensor searching the objects on the surface to find each one of the isolated groups of piled objects, and obtaining position data for each isolated group of piled objects found; and a robot grasping and picking up the top object of each isolated group of piled objects.

13. The apparatus of claim 12, wherein said visual sensor searches the objects on the surface to find each isolated object and obtains position data for each isolated object, and said robot grasps and picks up each isolated object using the position data.

14. A method for picking up objects placed in a pile on a surface, comprising:

dispersing the objects placed in a pile to provide isolated objects and isolated groups of piled objects, each one of the isolated groups of piled objects having a top object;

searching the objects on the surface by a visual sensor to find each one of the isolated groups of piled objects, and obtaining position data for each isolated group of piled objects found; and picking up, by a robot, the top object of each isolated group of piled objects.

15. The method of claim 14, further comprising:

searching the objects on the surface for isolated objects and obtaining position data for each isolated object; and picking up each isolated object using the position data.

* * * * *